US006811332B2

(12) United States Patent
Koike (10) Patent No.: US 6,811,332 B2
(45) Date of Patent: Nov. 2, 2004

(54) APPARATUS HAVING PUSH-OPERATABLE OPERATION MEMBER, AND CAMERA

(75) Inventor: Noriko Koike, Machida (JP)

(73) Assignee: Olympus Corporation (JP)

( * ) Notice: Subject to any disclaimer, the term of this patent is extended or adjusted under 35 U.S.C. 154(b) by 0 days.

(21) Appl. No.: 10/287,834

(22) Filed: Nov. 1, 2002

(65) Prior Publication Data

US 2003/0086707 A1 May 8, 2003

(30) Foreign Application Priority Data

Nov. 5, 2001 (JP) .................................... 2001-339817

(51) Int. Cl.[7] .............................................. G03B 17/38
(52) U.S. Cl. ...................................... 396/502; 396/543
(58) Field of Search ................................. 346/502, 543, 346/299, 25, 29, 542, 247; 200/341, 342, 345, 520

(56) References Cited

U.S. PATENT DOCUMENTS 5,018,951 A * 5/1991 Wang .................... 417/423.15
5,173,578 A * 12/1992 Tama ......................... 200/345
6,002,093 A * 12/1999 Hrehor et al. ............... 200/345
6,088,531 A * 7/2000 Endoh ......................... 396/29

FOREIGN PATENT DOCUMENTS

JP          1-254937      10/1989
JP          1-276125      11/1989

* cited by examiner

*Primary Examiner*—David Gray
*Assistant Examiner*—Rochelle Blackman
(74) *Attorney, Agent, or Firm*—Ostrolenk, Faber, Gerb & Soffen, LLP (57) ABSTRACT

An operation button is provided with a shaft portion and a pair of arm portions and projections, and a rear cover is provided with a shaft hole, and a pair of insertion holes and pulling-out preventing portions around the shaft hole. The shaft portion of the operation button is inserted into the shaft hole of the rear cover, and the pair of arm portions and projections are inserted into the insertion holes of the rear cover. The operation button is rotated around the shaft portion, whereby the projections are received in the pulling-out preventing portions in a push-operatable manner.

18 Claims, 4 Drawing Sheets

APPARATUS HAVING PUSH-OPERATABLE OPERATION MEMBER, AND CAMERA

CROSS-REFERENCE TO RELATED APPLICATIONS

This application is based upon and claims the benefit of priority from the prior Japanese Patent Application No. 2001-339817, filed Nov. 5, 2001, the entire contents of which are incorporated herein by reference.

BACKGROUND OF THE INVENTION

1. Field of the Invention

The present invention relates to an apparatus provided with a push-operatable operation member such as a release button, and a camera.

2. Description of the Related Art

Conventionally, with regard to a camera, as an attaching structure of a release button arranged to be freely operated in a camera main body, structures disclosed in, for example, Jpn. Pat. Appln. KOKAI Publication Nos. 1-276125 and 1-254937, and the like have been suggested.

In the former case, the release button is provided with an arm having a claw for preventing pulling-out. On an exterior of the camera, there is formed an insertion hole into which the clawed arm of the release button is inserted.

In the above disclosed constitution, the arm of the release button is inserted into the insertion hole on the exterior of the camera in a state bent by the utilization of its elasticity, and when inserted up to a predetermined position, the arm is spread at an initial position by its elastic force, whereby the claw is locked in an inner wall of the exterior of the camera to attach the release button in a push-operatable state.

In the camera disclosed in the latter publication, a button shaft extends from the release button, and the camera housing has an insertion hole into which the button shaft is inserted. In order to attach the release button to the exterior of the camera, the button shaft of the release button is inserted into the insertion hole from the outside of the camera exterior, and a snap ring for preventing pulling-out is mounted on a tip of the button shaft from the inside of the camera exterior, whereby the release button is attached to the exterior of the camera in a push-operatable state.

However, in the former case of the above attaching structures of the release button, if the arm is not formed in the release button so as to possess a length set in consideration of a bending amount of the arm and the like, there is a fear that the arm will be deformed or damaged in bending the arm to attach the release button to the exterior of the camera. Accordingly, the arm of the release button must be set relatively long, and a large space must be required in its operation direction, consequently causing a problem that the camera is to have a larger size.

In the latter publication, the button shaft of the release button must be inserted into the insertion hole from the outside of the camera exterior, and the snap ring must be mounted on the tip of the button shaft from the inside of the camera, which inconveniently makes assembling work very burdensome. In addition, since the snap ring must be separately prepared, assembling workability inconveniently deteriorates.

As described above, the attaching structures of the conventional release buttons have an inconvenience is that the camera is to have a larger size and another inconvenience that the assembling work is burdensome.

BRIEF SUMMARY OF THE INVENTION

A feature of the present invention is to provide an apparatus having a push-operatable operation member which is simple in structure, makes it possible to miniaturize the apparatus, and is capable of realizing simple and easy assembling work.

Another feature of the present invention is to provide a camera having a push-operatable operation member.

According to the present invention, there is provided an apparatus having a push-operatable operation member, comprising:

a shaft portion disposed in the operation member and extending in a push direction;

a claw portion disposed in the operation member and projecting toward the outside of the operation member;

a base having a shaft hole portion to slidably support the shaft portion and an insertion hole portion into which the claw portion is inserted, the base being provided with the operation member;

an abutting surface disposed on the base and capable of abutting on the claw portion; and an urging member to urge the operation member in a direction in which the claw portion and the abutting surface abut on each other;

wherein the claw portion is inserted into the insertion hole portion in attaching the operation member to the base, the operation member is then rotated around the shaft portion, and the claw portion is set at a position to abut on the abutting surface and prevent the operation member from falling from the base.

According to the foregoing constitution, the claw portion of the operation member is received in the insertion hole of the base by inserting the shaft portion into the shaft hole of the base against the urging force of the urging member and then rotating the operation member, and the claw portion abuts on the abutting surface of the base and inserted thereinto in a push-operatable state of the operation member. In consequence, it is possible to easily carry out a work of mounting the operation member to the base from the outside of the base, and to minimize the operation member in an axial direction.

Additional features and advantages of the invention will be set forth in the description which follows, and in part will be obvious from the description, or may be learned by practice of the invention. The features and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

Next, detailed description will be made of embodiments of the present invention with reference to the accompanying drawings.

Figure 1:
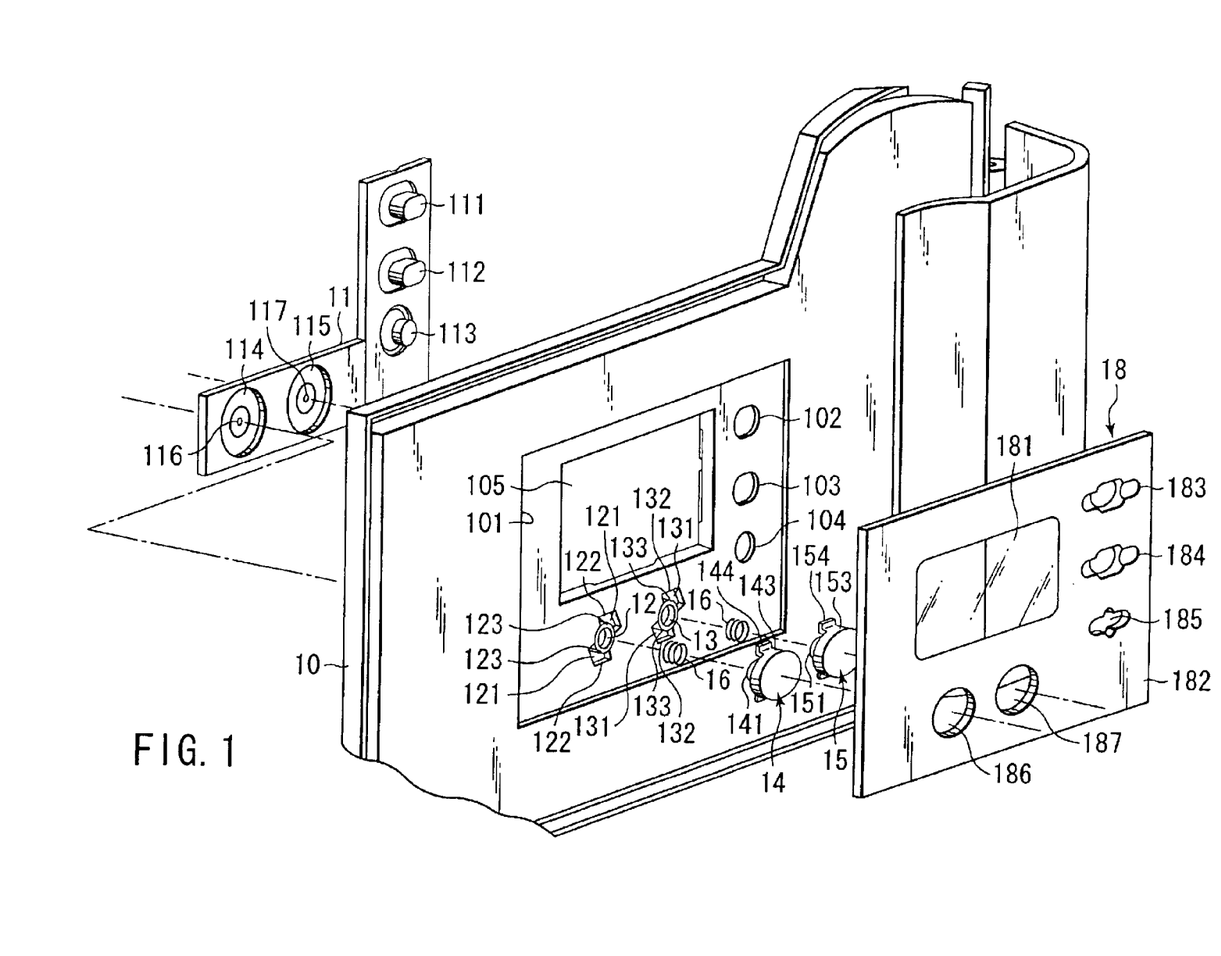
FIG. 1 is an exploded perspective view showing main portions of a camera having an operation member regarding an embodiment of the present invention.

FIG. 1 shows a camera having an operation member regarding an embodiment of the present invention. In this drawing, reference numeral 10 denotes a rear cover constituting an exterior member disposed around a not-shown camera main body. The rear cover 10 includes a concave portion 101 disposed in its center. In this concave portion 101, a plurality of, for example, three button holes 102, 103, 104, and a display hole 105 are disposed side by side. Buttons 111, 112, 113 integrally disposed at one end of a roughly L-shaped waterproof rubber plate 11 are inserted into the button holes 102, 103, 104, respectively, from the inside of the rear cover 10. On the other hand, a not-shown liquid crystal display (LCD) mounted on the camera main body (not shown) is arranged opposite to the display hole 105.

Figure 2:
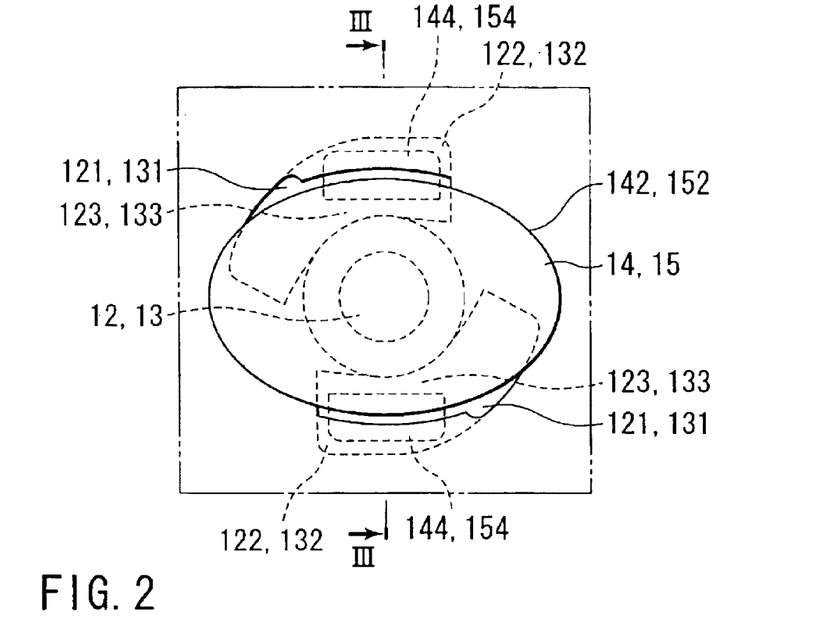
FIG. 2 is a plan view showing an attached state of FIG. 1 seen from a front side.
Figure 3:
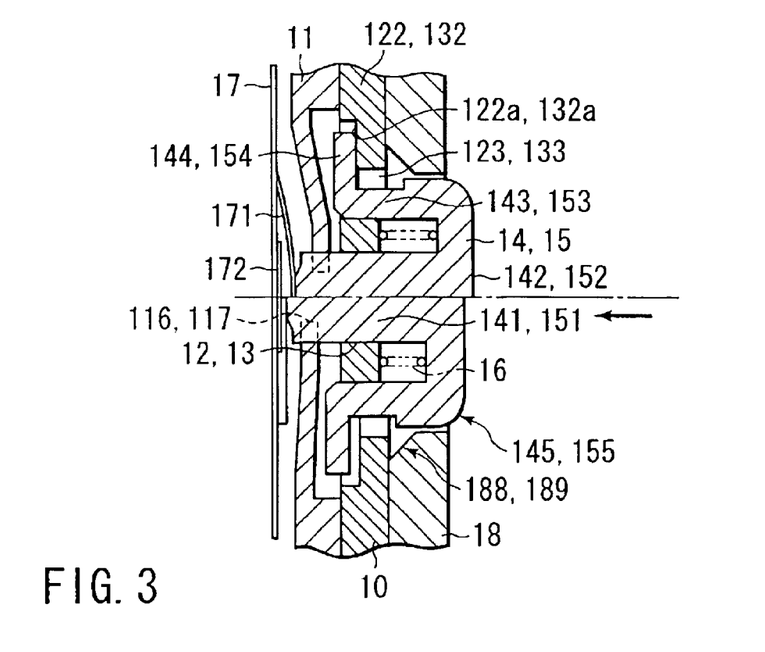
FIG. 3 is a sectional view cut along the line III—III in FIG. 2.

Furthermore, in the concave portion 101, there are disposed side by side two shaft holes 12, 13 into which shaft portions 141, 151 of operation buttons 14, 15 as operation members are inserted in a push-operatable manner. The operation buttons 14, 15 and the shaft holes 12, 13 are constructed roughly similarly to each other as shown in FIGS. 2 and 3. Accordingly, for convenience, one of the respective portions will be representatively explained hereinafter, and similar portions will be denoted by similar reference numerals to omit explanation of the other.

That is, the operation buttons 14, 15 set in the shaft holes 12, 13 have operational portions 142, 152, respectively. The operational portions 142, 152 are provided at the ends of the shaft portions 141, 151 of the buttons 14, 15. The operational portions 142, 152 has such a shape (e.g., elliptical) that points on the outer circumference are at different distances from the center. The operational portions 142, 152 are provided with a pair of arm portions 143, 153 roughly symmetrically so as to project in axial directions, for example, on short diameter sides of the outer peripheral portions. The arm portions 143, 153 are provided with pulling-out preventing projections 144, 154, respectively, which are disposed so as to project outward. Furthermore, on the outer peripheral portions of the operational portions 142, 152, R portions 145, 155 are formed.

On the other hand, around the shaft holes 12, 13 of the rear cover 10, a pair of insertion holes 121, 131 for inserting the projection portions are roughly symmetrically disposed in intermediate positions between long diameter portions and short diameter portions of the operational portions 142, 152 of the operation buttons 14, 15. On a backside of the rear cover 10, there are formed a pair of pulling-out preventing portions 122, 132 which constitute abutting surfaces for abutting the projections 144, 154 of the pair of arm portions 143, 153 to exert a function of preventing pulling-out. The pulling-out preventing portions 122, 132 are formed so as to be concaved by, for example, one step, on the backside of the rear cover 10. The projections 144, 154 abut on bottom surfaces 122a, 132a of the concave portions.

Guide portions 123, 133 are formed as roughly circular-arc openings around the shaft holes 12, 13 so that the arm portions 143, 153 may be rotated and moved around the shaft holes 12, 13. The guide portions 123, 133 are formed continuously with the insertion holes 121, 131. The pulling-out preventing portions 122, 132 are formed on the backside (inner surface side) of the rear cover 10 and on the outer peripheral sides of the guide portions 123, 133. Furthermore, the bottom surfaces 122a, 132a extend to the insertion holes 121, 131 so as to enable the operation buttons 14, 15 to be detached even after the rear cover 10 having the operation buttons 14, 15 attached thereto has been mounted to the camera main body as shown in a sectional view of FIG. 3.

In the embodiment, the pulling-out preventing portions 122, 132 are concaved by one step, but instead of the concave shape, the pulling-out preventing portions 122, 132 may be formed on the same plane as the other surface of the rear cover 10.

The shaft portions 141, 151 of the operation buttons 14, 15 are inserted, at their tips, respectively into the shaft holes 12, 13 of the rear cover 10. More precisely, the arm portions 143, 153 of the operation buttons 14, 15 are inserted into the insertion holes 121, 131 of the rear cover 10. The arm portions 143, 153 are then rotated around the shaft portions 141, 151, while being pushed in the direction of the arrow against the force of the coil springs 16. The projections 144, 154 are set into the pulling-out preventing portions 122, 132, respectively. In other words, the projections 144, 154 are set in positions to abut on the bottom surfaces 122a, 132a as the abutting surfaces.

The coil springs 16 apply push force of a detaching direction (reverse to an arrow direction) to the operation buttons 14, 15. Accordingly, the projections 144, 154 of the arm portions 143, 153 of the operational portions 142, 152 abut on the pulling-out preventing portions 123, 132 of the rear cover 10 by the push force of the coil springs 16. Thus, the operation buttons 14, 15 can be assembled to the rear cover 10, and pushed in the arrow direction against the push force of the coil springs 16.

In the other end of the waterproof rubber plate 11, concave portions 114, 115 are disposed respectively corresponding to the shaft holes 12, 13 of the rear cover 10. In the concave portions 114, 115, fitting holes 116, 117 are disposed corresponding to the shaft portions 141, 151 of the operation buttons 14, 15. The fitting holes 116, 117 of the concave portions 114, 115 are arranged oppositely to a switch contact 171 disposed on a printed wiring board 17 disposed inside the waterproof rubber plate 11.

The printed wiring board 17 is attached to, for example, the camera main body (not shown). When the switch contact 171 is pushed by the shaft portions 141, 151 of the operation buttons 14, 15 assembled to the rear cover 10, the switch contact 171 is connected to an electrode 172 and turned ON. After the turning-ON of the switch contact 171 connected to the electrode 172, an operation signal is entered to a not-shown control unit, and a not-shown camera component or the like is controlled.

In addition, in the concave portion 101 of the rear cover 10, a panel 18 as an exterior panel is fitted and attached. The panel 18 includes a transmission window 181 disposed in its center corresponding to the display hole 105 of the rear cover 10. Around the transmission window 181, for example, an area 182 painted with black color is disposed.

The black color painted area 182 of the panel 18 includes three button holes 183, 184, 185 disposed corresponding to the button holes 102, 103, 104 of the rear cover 10. The black color painted area 182 also includes two button holes 186, 187 as hole portions disposed at a predetermined interval corresponding to the shaft holes 12, 13 of the rear cover 10. The two button holes 186, 187 receive the operational portions 142, 152 of the operation buttons.

The button holes 186, 187 are formed so as to change distances of from the centers thereof to the outer edges roughly similarly to the outer peripheral shapes of the operational portions 142, 152 of the operation buttons 14, 15. Chamfered portions 188, 189 are disposed in a peripheral edge portion of the rear cover side. Accordingly, in the embodiment, the button holes 186, 187 are formed in elliptical shapes corresponding to the shape of the operational portion 142.

The buttons 111, 112, 113 integrally formed in the waterproof rubber plate 11 are inserted into the button holes 183, 184, 185 of the panel 18, and the operational portions 142, 152 of the operation buttons 14, 15 assembled to the shaft holes 12, 13 of the rear cover 10 are inserted into the buttons holes 186, 187, thereby fitting the panel 18 in the concave portion 101 of the rear cover 10. In this case, the chamfered portions 188, 189 disposed on the inner peripheral walls of the operations holes 186, 187 of the panel 18 abut on the R portions 145, 155 of the operation buttons 14, 15 and guided, thereby rotating the operation buttons 14, 15 around the shaft holes 12, 13. Thus, rotational-direction positions of the button holes 186, 187 and the operational portions 142, 152 around the shaft holes 12, 13 coincide with each other.

That is, since the operation buttons 14, 15 can be rotated around the shaft holes 12, 13 while the operation buttons 14, 15 are attached to the rear cover 10, the operation buttons 14, 15 may not be set in normal rotational positions. Therefore, according to the embodiment, by disposing the chamfered portions 188, 189 and the R portions 145, 155 as described above, the panel 18 is assembled to set the operation buttons 14, 15 in the normal positions even if slight positional deviation occurs in the operation buttons 14, 15. Then, the panel 18 is fitted in a desired position of the concave portion 101 provided in the rear cover 10.

As described above, the operation buttons 14, 15 are received in the button holes 186, 187 of the panel 18. Accordingly, when rotating force is applied, the outer peripheral portions of the operational portions 142, 152 abut on the inner walls of the button holes 186, 187 of the panel 18 to regulate their rotation, whereby the operation buttons 14, 15 are mounted in an only push-operatable manner.

In the foregoing constitution, the waterproof rubber plate 11 is attached to the inside of the rear cover 10 by inserting the buttons 111, 112, 113 into the button holes 102, 103, 104. In this state, the coil springs 16 are mounted on the shaft portions 141, 151 of the operational buttons 14, 15. Then, the tips of the shaft portions 141, 151 are inserted into the shaft holes 12, 13 of the rear cover 10. The projections 144, 154 of the arm portions 143, 153 are then inserted into the insertion holes 121, 131.

Subsequently, the operational buttons 14, 15 are pushed in the direction of arrow (FIG. 3) against the force of the coil springs 16. While buttons 14, 15 are being so pushed, their arm portions 143, 153 are rotated around the shaft portions 141, 151 and along the guide portions 123, 133. The projections 144, 154 are thereby moved to the pulling-out preventing potions 122, 132, respectively. Thus, the operational buttons 14, 15 are assembled into the concave 101 of the rear cover 10, with the projections 144, 154 abutting on the pulling-out preventing portions 122, 132 by virtue of the force of the coil springs 16.

Then, the buttons 111, 112, 113 and the operation buttons 14, 15 are received in the button holes 183, 184, 185, 186, 187 so as to be operated from the outside as described above, thereby attaching the panel 18 to the concave portion 101 of the rear cover 10. The panel 18 shuts off parts of the insertion holes 121, 131 and the guide portions 123, 133 exposed around the operational portions 142, 152 of the operation buttons 14, 15 in a manner of blindfolding them. The operational portions 142, 152 are received in the button holes 186, 187 of the panel 18, and the outer peripheral portions of the operational portions 142, 152 are arranged oppositely to the inner walls of the button holes 186, 187 of the panel 18. Accordingly, even if rotating forces are applied, the operation buttons 14, 15 are regulated for rotation by the button holes 186, 187, and initial push positions are secured.

The operation buttons 14, 15 thus mounted can be pushed in the axial direction as shown in the sectional view of FIG. 3. It is to be noted that, in FIG. 3, upper and lower sides from a center line show non-push operation time and push operation time, respectively.

When the operational portions 142, 152 of the operation buttons 14, 15 received in the button holes 186, 187 of the panel 18 are pushed against the push force of the coil springs 16, the shaft portions 141, 151 are guided by the shaft holes 12, 13 of the rear cover 10, and moved in the arrow direction. Here, the tips of the operational portions 142, 152 of the operation buttons 14, 15 move and push the backside of the switch contact 171 disposed on the printed wiring board 17 in an electrode direction, connect it to the electrode 172, and turns it ON. After the connection of the switch contact 171 to the electrode 172, its ON signal is entered to the not-shown control unit, and the not-shown camera component or the like is controlled.

When the push operations of the operational portions 142, 152 are released, the operation buttons 14, 15 are moved and pushed in the direction of initial positions by the push force of the coil springs 16. After the operation buttons 14, 15 reach the initial positions, the projections 144, 154 abut on the pulling-out preventing portions 122, 123 of the rear cover 10, and returned to the initial operation positions to be pushed. In this case, the switch contact 171 is separated from the electrode 172 by its own elastic force, and returned to an OFF position.

Thus, the camera having the operation members is constructed such that by inserting the shaft portions 141, 151 of the operation buttons 14, 15 into the shaft holes 12, 13 of the rear cover 10, and the pair of arm portions 143, 153 and the projections 144, 154 into the insertion holes 121, 131 of the rear cover 10, and rotating the operation buttons 14, 15 around the shaft portions 141, 151, the projections 144, 154 can abut on the bottom surfaces 122a, 132a of the pulling-out preventing portions 122, 132 of the rear cover 10 to provide pulling-out preventing functions for preventing falling-off of the operation buttons 14, 15 from the rear cover 10.

According to this constitution, the work of assembling the operation buttons 14, 15 to the rear cover 10 can be easily carried out from only one direction, i.e., from the outside of the rear cover 10, and no elastically deformed portions similar to the conventional arms need be disposed in the operation buttons 14, 15. Therefore, the operation buttons 14, 15 can be minimized in the axial direction, facilitating miniaturization of the camera.

Additionally, in the camera having the operation members, the operational portions 142, 152 of the operation buttons 14, 15 are formed in such an elliptical shape as to change the distances of from the rotational centers of the shaft portions 141, 151 to the outer edges, and the operational portions 142, 152 of the operation buttons 14, 15 are disposed in the button holes 186, 187 similarly formed in such an elliptical shape as to change the distances of from the hole centers to the outer edges in the panel 18, whereby the rotation of the operation buttons 14, 15 can be prevented by the panel 18.

According to this constitution, the panel 18 regulates the rotation of the operational portions 142, 152 of the operation buttons 14, 15 by the button holes 186, 187, thereby regulating the rotation of the operation buttons 14, 15 mounted on the rear cover 10 so as to be pushed, and regulates the falling-off of the projections 144, 154 of the operation buttons 14, 15 from the pulling-out preventing portions 122, 132 of the rear cover 10, thereby realizing the prevention of pulling-out from the rear cover 10. Therefore, it is possible to simply and easily realize sure assembling of the operation buttons 14, 15 assembled to the rear cover 10 so as to be pushed.

Further, the bottom surfaces 122a, 132a, on which the projections 144, 154 abut, are formed to extend to the insertion holes 121, 131. Accordingly, the operation buttons 14, 15 can be detached even while the rear cover 10 is assembled to the camera main body.

Around the button holes 186, 187 of the panel 18, the black color painted area 182 is provided as a non-transmission portion to make the inside invisible, and the black color painted area 182 covers the guide holes 123, 133. Thus, the beauty can be enhanced without increasing the number of components.

According to the embodiment, the operational portions 142, 152 of the operation buttons 14, 15 are formed in such an elliptical shape as to change the distances of from the rotational centers of the shaft portions 141, 151 to the outer edges and, similarly, the button holes 186, 187 of the panel 18 are formed in such an elliptical shape as to change the distances of from the hole centers to the outer edges, thereby regulating the rotation thereof. However, as means for regulating the rotation, other means are effective roughly similarly, for example, means for forming the operational portions 142, 152 of the operation buttons 14, 15 in such an oval or polygonal shape as to change the distances of from the rotational centers of the shaft portions 141, 151 to the outer edges, and similarly forming the button holes 186, 187 of the panel 18 in such a shape as to change the distances of from the rotational centers to the outer edges.

The present invention is not limited to the foregoing embodiment. Other constitutions shown in FIGS. 4 to 7 can be employed, and roughly similar advantages can be expected. In FIGS. 4 to 7, portions similar to those of FIGS. 1 to 3 are denoted by similar reference numerals, and detailed description of the similar portions will be omitted.

Figure 4:
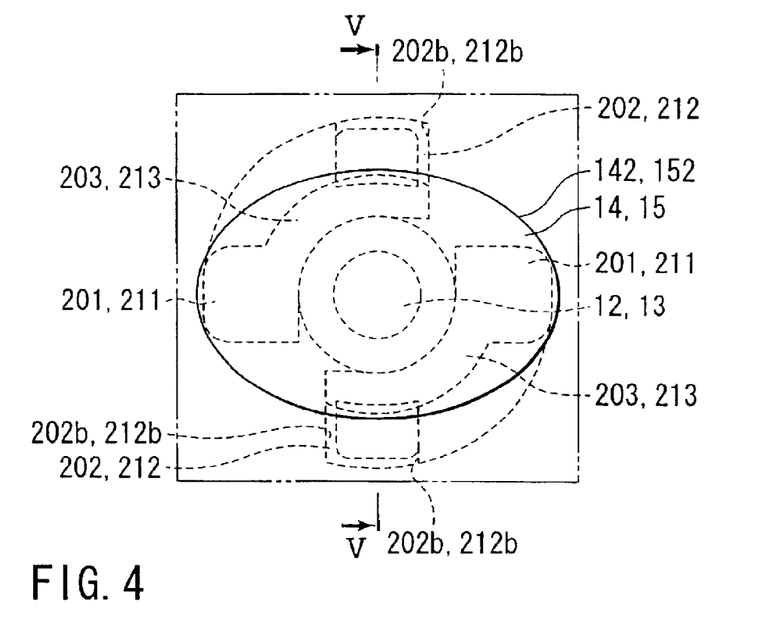
FIG. 4 is a plan view showing main portions of a camera having an operation member regarding another embodiment of the present invention.
Figure 5:
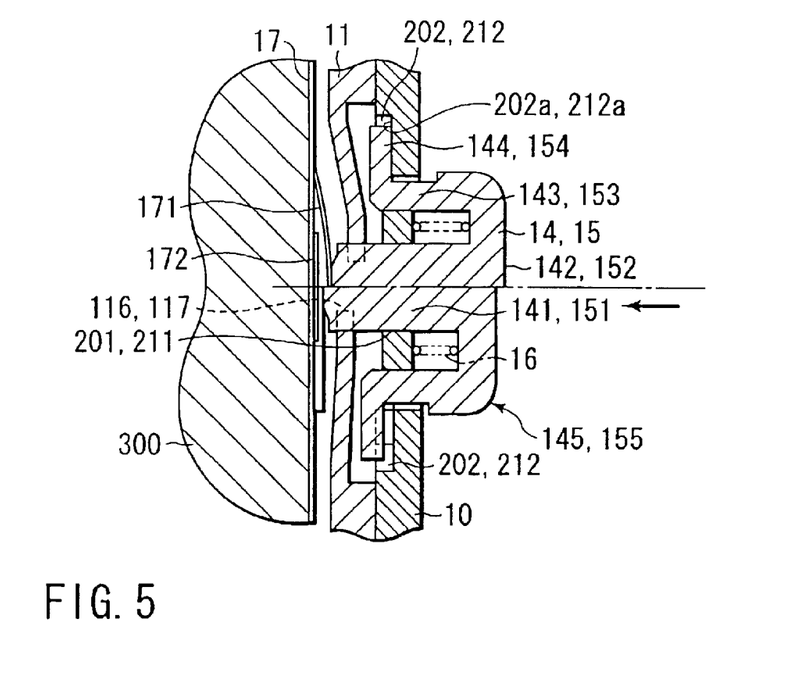
FIG. 5 is a sectional view cut along the line V—V in FIG. 4.
Figure 6:
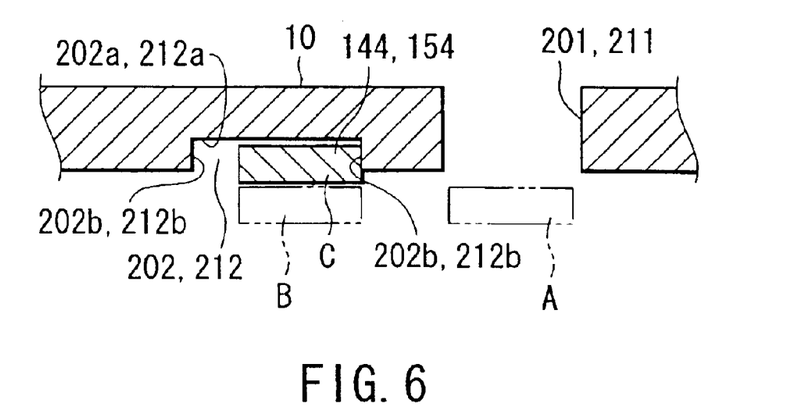
FIG. 6 is an explanatory sectional view showing an attaching operation of FIG. 4.

In the embodiment shown in FIGS. 4 to 6, around shaft holes 12, 13 of a rear cover 10, a pair of insertion holes 201, 211 are formed to be roughly symmetrical corresponding to long diameter sides of operational portions 142, 152 of operation buttons 14, 15. On a backside of the rear cover 10, corresponding to the pair of insertion holes 201, 211, for example, a pair of concaved projection receiving portions 202, 212 constituting abutting surfaces for receiving projections 144, 154 and preventing pulling-out are formed to be roughly symmetrical corresponding to short diameter sides of the operational portions 142, 152 of the operation buttons 14, 15.

In addition, around the shaft holes 12, 13 of the rear cover 10, guide portions 203, 213 are formed as roughly circular-arc openings continuously with the insertion holes 201, 211. The guide portions 203, 213 are formed in circular-arc shapes smaller than the short diameter sides of the operational portions 142, 152 around the shaft holes 12, 13, and adapted to guide arm portions 143, 153 rotatably around the shaft holes 12, 13.

The projection receiving portions 202, 212 are formed on the backside (inner side) of the rear cover 10, and on outer peripheral sides of the guide portions 203, 213. The projection receiving portions 202, 213 have pulling-out preventing functions for preventing falling-off of the operational portions 142, 152 from the rear cover 10, and rotation preventing functions for preventing the rotation of the operation buttons 14, 15 around the shaft holes 12, 13. In other words, in order to provide the pulling-out preventing functions, concave bottom surfaces 202a, 212a of the projection receiving portions 202, 212 become abutting surfaces, on which the projections 144, 154 abut. In order to provide the rotation preventing functions, concave side walls 202b, 212b of the projection receiving portions 202, 212 are formed. In particular, the side walls 202b, 212b shown in a right side of FIG. 6 prevent the counterclockwise rotation of the operation buttons 14, 15 in FIG. 4, and the projections 144, 154 move to positions coincident with the insertion holes 201, 211 to prevent falling-off of the operation buttons 14, 15 during use.

According to the foregoing constitution, when the operation buttons 14, 15 are assembled to the rear cover 10, first, the arm portions 143, 153 of the operational portions 142, 152 are inserted into the insertion holes 201, 211 of the rear cover 10 integrally with the projections 144, 154, and pushed and moved in an arrow direction to a position A in FIG. 6 against push force of coil springs 16. In this state, the arm portions 143, 153 of the operational portions 142, 152 are rotated toward the projection receiving portions along the guide portions 203, 213, and moved to a position B, and the projections 144, 154 are placed oppositely to the projection receiving portions 202, 212. Then, when the push operations of the operational portions 142, 152 of the operation buttons 14, 15 are released, shaft portions 141, 151 are moved in a direction reverse to the arrow direction in FIG. 5 by push force of the coil springs 16, and the operational portions 142, 152 are moved to a position C for receiving the projections 144, 154 in the projection receiving portions 202, 212.

Here, in a state where the shaft portions 141, 151 of the operation buttons 14, 15 are assembled to the shaft holes 12, 13 of the rear cover 10 so as to be freely pushed, both sides of the respective projections 144, 154 of the arm portions 143, 153 are placed oppositely to the side walls 202b, 212b of the projection receiving portions 202, 212. Accordingly, both sides of the respective projections 144, 154 of the arm portions 143, 153 are regulated by the side walls 202b, 212b, thereby regulating the rotation of the operation buttons 14, 15.

In addition, the operational portions 142, 152 of the operation buttons 14, 15 function to shut off the insertion holes 201, 211 and the guide portions 203, 213 formed in the rear cover 10, making the guide portions 203, 211 invisible from the outside.

The rear cover 10 having the operation buttons 14, 15 thus assembled thereto is fixed so as to cover a camera main body 300 provided with a printed wiring board 17.

Then, as shown in FIG. 5, within push operation ranges of the assembled operation buttons 14, 15, the projections 144, 154 are prevented from being detached from the projection receiving portions 202, 212. In other words, operation amounts of the operation buttons 14, 15 are regulated by the camera main body 300 provided with the printed wiring board 17. Concaving amounts of the projecting receiving portions 202, 212 are set in accordance with thicknesses of the projections 144, 154 in operation directions, and push amounts.

Accordingly, since the push directions of the operation buttons 14, 15 are not regulated at all before the rear cover 10 is assemble to the camera main body 300, the operation buttons 14, 15 can be assembled to the rear cover 10. After the assembling of the rear cover 10 to the camera main body 300, the projections 144, 154 are always prevented from falling off from the projection receiving portions 202, 212.

Figure 7:
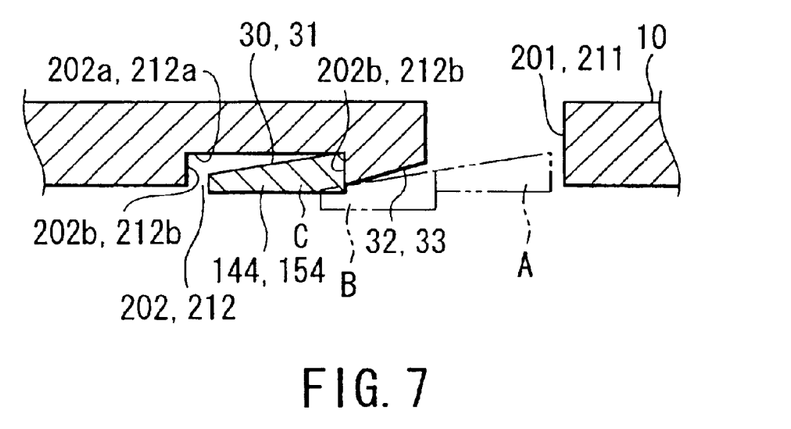
FIG. 7 is a sectional view showing main portions of a camera having an operation member regarding still another embodiment of the present invention.

According to the embodiment of FIG. 7, slopes 30, 31 inclined to be tapered in assembling rotational directions are formed on upper surfaces of projections 144, 154 formed on the pair of arm portions 143, 153 of operational portions 142, 152 of operation buttons 14, 15 in the above-mentioned embodiment shown in FIGS. 4 to 6. On the other hand, in a rear cover 10, between a pair of insertion holes 201, 211 and a pair of projection receiving portions 202, 212, slopes 32, 33 inclined to be tapered in assembling rotational directions are formed corresponding to the slopes 30, 31 of the projections 144, 154 of the operational portions 142, 152 of the operation buttons 14, 15.

According to the foregoing constitution, when the operation buttons 14, 15 are assembled to the rear cover 10, first, the arm portions 143, 153 of the operation buttons 14, 15 are inserted to a position A in the insertion holes 201, 211 of the rear cover 10 integrally with the projections 144, 154, and rotated toward the projection receiving portions along guide portions 203, 213. Here, the projections 144, 154 of the operation buttons 14, 15 are moved to a position C opposite the projection receiving portions 144, 154 via a position B for sliding the slopes 30, 31 on the slopes 32, 33 of the rear cover 10. Then, shaft portions 141, 151 are moved in a direction reverse to the arrow direction in FIG. 5 by push force of coil springs 16, thereby receiving the projections 144, 154 of the operation buttons 14, 15 in the projection receiving portions 202, 212.

In such received states, the shaft portions 141, 151 of the operation buttons 14, 15 are assembled to shaft holes 12, 13 of the rear cover 10 so as to be freely pushed. In addition, both sides of the projections 144, 154 of the arm portions 143, 153 are placed oppositely to side walls 201b, 212b of the projection receiving portions 202, 212, thereby is regulating the operation buttons 14, 15 by the side walls 202b, 212b. Accordingly, the rotation of the operation buttons 14, 15 is regulated.

According to the embodiment, it is possible to further enhance assembling workability of the operation buttons 14, 15 to the rear cover 10.

In the embodiments shown in FIGS. 4 to 7, since the projection receiving portions 202, 212 function to prevent pulling-out of the operation buttons 14, 15, and to prevent the rotation, the panel 18 of the previous embodiment can be eliminated. Since the guide portions 203, 213 are formed in the circular-arc shapes smaller than the short diameter sides of the operational portions 142, 152 of the guide portions 203, 213, and the insertion holes 201, 213 are formed to be long diameter sides of the operational portions 142, 152, the hole portions are covered with the operational portions 142, 152, and the beauty is not lost.

In addition, the operational portions 142, 152 are also formed in elliptical shapes in the embodiments shown in FIGS. 4 to 7, but in order to similarly obtain the above effects, the operational portions 142, 152 may be shaped so as to change distances of from centers of the shaft portions 141, 151 to their outer edges.

Furthermore, in the above-mentioned embodiments, the arm portions 143, 153 formed in the operational portions 142, 152 of the operation buttons 14, 15 are constituted of a pair of two, but various constitutions are possible without limiting the number.

Moreover, the urging members of the invention are not limited to the various function operation buttons, and release buttons can be employed.

Furthermore, the embodiments have been described by way of representative case, where the invention is applied to the camera. However, there is no limitation placed in this regard, and the invention can be applied to other apparatus provided with push-operatable operation members.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general invention concept as defined by the appended claims and their equivalents.

What is claimed is:

1. An apparatus having a push-operable operation member, comprising:

a shaft portion disposed in the operation member and extending in a push direction;

a claw portion disposed in the operation member and projecting toward the outside of the operation member;

a base having a shaft hole portion to slidably support the shaft portion and an insertion hole portion into which the claw portion is inserted the base being provided with the operation member, the shaft hole portion and the insertion hole portion being formed as through holes which extend from an outer side of the base to an inner side thereof, and allow the shaft portion and the claw portion to be inserted in the push direction into the through holes, respectively;

an abutting surface disposed on the base and capable of abutting on the claw portion; and an urging member to urge the operation member in a direction in which the claw portion and the abutting surface abut on each other;

wherein the claw portion is inserted into the insertion hole portion in attaching the operation member to the base, the operation member is then rotated around the shaft portion, and the claw portion is set at a position to abut on the abutting surface and prevent the operation member from falling from the base, and wherein the insertion hole portion is so sized and located relative to the shaft hole portion as to enable disattaching the operation member from the base by counter-rotating the operation member to a position where the claw portion can be withdrawn through the insertion hole portion.

2. The apparatus according to claim 1, further comprising:

an operational portion disposed in the operation member and having such an outer peripheral shape as to change distances from a center of the shaft portion to its outer edges in order to have a short side portion and a long side portion; and a panel having a hole portion corresponding to the outer shape of the operational portion, the operational portion being inserted into the hole portion in a state where the panel is attached to the base; wherein
   the operation member is regulated for rotation around the shaft portion by the panel in a state where the operation member is attached to the base.

3. The apparatus according to claim 2, further comprising:
an arm portion extending from the short side portion of the operational portion in an extending direction of the shaft portion in an extending direction of the shaft portion to connect the claw portion and the operational portion to each other; and
a guide portion formed continuously with the insertion hole portion of the base and in a circular-arc shape around the shaft hole portion in order to allow the arm portion to pass when the operation member is rotated to be attached to the base, the guide portion being formed so as to have a larger diameter than the short side portion of the operational portion and a smaller diameter than the long side portion of the operational portion; wherein
   the guide portion is covered with the panel.

4. The apparatus according to claim 1, further comprising:
an operational portion disposed in the operation member and having a roughly elliptical outer peripheral shape around the shaft portion; and
a panel having a hole portion corresponding to the outer shape of the operational portion, the operational portion being inserted into the hole portion in a state where the panel is attached to the base; wherein
   the operation member is regulated for rotation around the shaft portion by the panel in a state where the operation member is attached to the base.

5. The apparatus according to claim 1, further comprising:
an operational portion disposed in the operation member and having a roughly oval outer peripheral shape around the shaft portion; and
a panel having a hole portion corresponding to the outer shape of the operational portion, the operational portion being inserted into the hole portion in a state where the panel is attached to the base; wherein
   the operation member is regulated for rotation around the shaft portion by the panel in a state where the operation member is attached to the base.

6. The apparatus according to claim 1, further comprising:
an operational portion disposed in the operation member and having a roughly polygonal outer peripheral shape around the shaft portion; and
a panel having a hole portion corresponding to the outer shape of the operational portion, the operational portion being inserted into the hole portion in a state where the panel is attached to the base; wherein
   the operation member is regulated for rotation around the shaft portion by the panel in a state where the operation member is attached to the base.

7. The apparatus according to claim 1, further comprising:
a rotation preventing projection provided on a locus of the claw portion in rotating the operation member around the shaft portion so as to project in a push direction at a predetermined position on the base and so as to engage with the claw portion; and
a rotation preventing surface disposed at one end of the claw portion so as to abut on the rotation preventing projection; wherein
   after the operation member has been rotated and attached to the base, the rotation preventing projection and the rotation preventing surface can abut on each other, thereby regulating the rotation of the operation member around the shaft portion in a predetermined direction.

8. The apparatus according to claim 7, further comprising:
an operational portion disposed in the operation member and having such an outer peripheral shape as to change distances of from a center of the shaft portion to its outer edges so as to have a short side portion and a long side portion;
an arm portion extending from the operational portion in an extending direction of the shaft portion to connect the claw portion and the operational portion to each other;
and a guide portion formed continuously with the insertion hole portion on the base and in a circular-arc shape around the shaft hole portion; wherein
   the claw portion and the arm portion are formed on the short side portion of the operational portion, and the arm portion passes through the guide portion when the operation member is rotated to be attached to the base.

9. The apparatus according to claim 8, wherein the guide portion is formed so as to be a larger in diameter than the short side portion of the operational portion and to be smaller in diameter than the long side portion of the operational portion, and the guide portion is covered with the long side portion of the operational portion in a state where the operation member is attached to the base.

10. A camera comprising:
a push-operable operation member;
a shaft portion disposed in the operation member and extending in a push direction;
a claw portion disposed in the operation member and projecting toward the outside of the operation member;
an exterior member having a shaft hole portion to slidably support the shaft portion, and an insertion hole portion into which the claw portion is inserted, the exterior member being provided with the operation member, the shaft hole portion and the insertion hole portion being formed as through holes which extend from an outer side of the exterior member to an inner side thereof, and allow the shaft portion and the claw portion to be inserted in the push direction into the through holes, respectively and adapted to cover at least a part of a camera main body;
an abutting surface disposed in the exterior member to abut on the claw portion; and
an urging member to urge the operation member in a direction in which the claw portion and the abutting surface abut on each other;
wherein the claw portion is inserted into the insertion hole portion in attaching the operation member to the exterior member; the operation member is then rotated around the shaft portion, and the claw portion is set at a position to abut on the abutting surface and prevent the operation member from falling from the exterior member and
wherein the insertion hole portion is so sized and located relative to the shaft hole portion as to enable disattaching the operation member from the base by counter-rotating the operation member to a position where the claw portion can be withdrawn through the insertion hole portion.

11. The camera according to claim 10, further comprising:
an operational portion disposed in the operation member and having such an outer peripheral shape as to change distances of from a center of the shaft portion to its outer edges so as to have a short side portion and a long side portion; and
a panel having a hole portion corresponding to the outer shape of the operational portion, the operational portion being inserted into the hole portion in a state where the panel is attached to the exterior member; wherein
the operation member is regulated for rotation around the shaft portion by the panel in a state where the operation member is attached to the exterior member.

12. The camera according to claim 11, further comprising:
an arm portion extending from the short side portion of the operational portion in an extending direction of the shaft portion to connect the claw portion and the operational portion to each other; and
a guide portion formed continuously with the insertion hole portion of the exterior member and in a circular-arc shape around the shaft hole portion in order to allow the arm portion to pass when the operation member is rotated to be attached to the exterior member, the guide portion being formed so as to have a larger diameter than the short side portion of the operational portion and a smaller diameter than the long side portion of the operational portion; wherein
the guide portion is covered with the panel.

13. The camera according to claim 10, further comprising:
an operational portion disposed in the operation member and having a roughly elliptical outer peripheral shape around the shaft portion; and
a panel having a hole portion corresponding to the outer shape of the operational portion, the operational portion being inserted into the hole portion in a state where the panel is attached to the exterior member; wherein
the operation member is regulated for rotation around the shaft portion by the panel in a state where the operation member is attached to the exterior member.

14. The camera according to claim 10, further comprising:
an operational portion disposed in the operation member and having a roughly oval outer peripheral shape around the shaft portion; and
a panel having a hole portion corresponding to the outer shape of the operational portion, the operational portion being inserted into the hole portion in a state where the panel is attached to the exterior member; wherein
the operation member is regulated for rotation around the shaft portion by the panel in a state where the operation member is attached to the exterior member.

15. The camera according to claim 10, further comprising:
an operational portion disposed in the operation member and having a roughly polygonal outer peripheral shape around the shaft portion; and
a panel having a hole portion corresponding to the outer shape of the operational portion, the operational portion being inserted into the hole portion in a state where the panel is attached to the exterior member; wherein
the operation member is regulated for rotation around the shaft portion by the panel in a state where the operation member is attached to the exterior member.

16. The camera according to claim 10, further comprising:
a rotation preventing projection disposed on a locus of the claw portion in rotating the operation member around the shaft portion so as to project in a push direction at a predetermined position on the exterior member and so as to engage with the claw portion; and
a rotation preventing surface disposed at one end of the claw portion to abut on the rotation preventing projection; wherein
after the operation member has been rotated and attached to the exterior member, the rotation preventing projection and the rotation preventing surface can abut on each other, thereby regulating the rotation of the operation member around the shaft portion in a predetermined direction.

17. The camera according to claim 16, further comprising:
an operational portion disposed in the operation member and having such an outer shape as to change distances of from a center of the shaft portion to its outer edges so as to have a short side portion and a long side portion;
an arm portion extending from the operational portion in an extending direction of the shaft portion to connect the claw portion and the operational portion to each other; and
a guide portion formed continuously with the insertion hole portion of the exterior member and in a circular-arc shape around the shaft hole portion; wherein
the claw portion and the arm portion are formed on the short side portion of the operational portion, and the arm portion passes through the guide portion when the operation member is rotated to be attached to the exterior member.

18. The camera according to claim 17, wherein the guide portion is formed so as to have a larger diameter than the short side portion of the operational portion and a smaller diameter than the long side portion of the operational portion, and the guide portion is covered with the long side portion of the operational portion in a state where the operation member is attached to the exterior member.

* * * * *